(12) United States Patent
Crum et al.

(10) Patent No.: US 11,898,068 B2
(45) Date of Patent: Feb. 13, 2024

(54) REVERSIBLE ADHESIVE APPARATUS (71) Applicant: Rockwell Automation Technologies, Inc., Mayfield Heights, OH (US)

(72) Inventors: Kyle A. Crum, Bayside, WI (US); Robert H. Schmidt, Mequon, WI (US); David A. Vasko, Hartland, WI (US); Neil R. Bentley, Boston, MA (US); Tracy M. Clark, Boston, MA (US); Michael D. Cook, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 188 days.

(21) Appl. No.: 17/350,455

(22) Filed: Jun. 17, 2021

(65) Prior Publication Data

US 2021/0403762 A1 Dec. 30, 2021

Related U.S. Application Data (60) Provisional application No. 63/043,216, filed on Jun. 24, 2020.

(51) Int. Cl.
*C09J 7/20* (2018.01)

(52) U.S. Cl.
CPC ............. *C09J 7/20* (2018.01); *C09J 2301/31* (2020.08)

(58) Field of Classification Search
CPC ...... C09J 7/20; C09J 2301/31; C09J 2203/37; C09J 7/30; B65G 47/90; B65G 2207/02
See application file for complete search history.

(56) References Cited

U.S. PATENT DOCUMENTS

| | | | |
|---|---|---|---|
| 6,541,098 B2 * | 4/2003 | Venkatasanthanam | ... B32B 3/28 428/161 |
| 7,845,483 B2 | 12/2010 | Noguchi et al. | |
| 8,337,656 B2 | 12/2012 | Nishio | |
| 9,162,820 B2 | 10/2015 | Hanisch et al. | |
| 9,574,113 B2 | 2/2017 | Crosby | |
| 9,603,419 B2 | 3/2017 | Crosby | |
| 10,144,195 B2 | 12/2018 | Crosby | |
| 10,150,892 B2 | 12/2018 | Crosby | |
| 10,259,975 B2 | 4/2019 | Pesika | |

(Continued)

FOREIGN PATENT DOCUMENTS

| | | |
|---|---|---|
| DE | 102010042753 A1 | 4/2012 |
| DE | 102011054701 A1 | 4/2013 |

(Continued)

OTHER PUBLICATIONS

Letter dated Mar. 15, 2023 Regarding Co-Pending Application U.S. Appl. No. 17/350,682, filed Jun. 17, 2021.

(Continued)

*Primary Examiner* — Patricia L. Nordmeyer
(74) *Attorney, Agent, or Firm* — Lippes Mathias LLP (57) ABSTRACT

A reversible adhesive apparatus includes a base and an adhesive layer. The base is configured with a series of concave and convex shapes at a top surface of the base according to some embodiments. The base is configured with a raised portion and a surrounding portion at a top surface of the base according to some other embodiments. The adhesive layer is disposed on top of the base. The adhesive layer configured to provide reversible adhesion on a top surface of the adhesive layer.

15 Claims, 8 Drawing Sheets

(56) References Cited

U.S. PATENT DOCUMENTS

| | | | |
|---|---|---|---|
| 10,773,847 B2 | 9/2020 | Bellante | |
| 11,065,771 B2 | 7/2021 | Shintake | |
| 2002/0058127 A1* | 5/2002 | Itada | C09J 7/22 |
| | | | 428/141 |
| 2004/0262127 A1 | 12/2004 | Harnish | |
| 2007/0013642 A1 | 1/2007 | Yoon et al. | |
| 2008/0025822 A1* | 1/2008 | Kim | H01L 21/68707 |
| | | | 414/800 |
| 2008/0280085 A1* | 11/2008 | Livne | C09J 7/20 |
| | | | 428/40.1 |
| 2009/0269536 A1* | 10/2009 | Carter | C09J 7/00 |
| | | | 156/60 |
| 2011/0016675 A1* | 1/2011 | Mayers | A44B 18/0049 |
| | | | 24/450 |
| 2016/0325950 A1* | 11/2016 | Urrutia Nebreda | B65H 3/20 |
| 2018/0243784 A1 | 8/2018 | Schultz | |
| 2018/0282069 A1 | 10/2018 | Frumkin | |
| 2020/0299551 A1 | 9/2020 | Sitti | |

FOREIGN PATENT DOCUMENTS

| | | |
|---|---|---|
| EP | 1318080 B1 | 6/2005 |
| EP | 2844590 B1 | 9/2016 |
| WO | 2007121450 A2 | 10/2007 |
| WO | 2015113614 A1 | 8/2015 |

OTHER PUBLICATIONS

European Patent Office, "Communication pursuant to Rule 62 EPC, Extended European Search Report", application No. 21181474.4 EPO, dated Feb. 4, 2022, 11 pages.

European Patent Office, "Communication pursuant to Rule 62 EPC, Extended European Search Report", application No. 21181515.4 EPO, dated Nov. 15, 2021, 7 pages.

European Patent Office, "Communication pursuant to Rule 64 EPC, Partial European Search Report", application No. 21181474.4 EPO, dated Nov. 23, 2021, 12 pages.

"Controllable load sharing for soft adhesive interfaces on three-dimensional surfaces"; Sukho Songa,b, Dirk-Michael Drotlefa, Carmel Majidib, and Metin Sitti; Physical Intelligence Department, Max Planck Institute for Intelligent Systems Stuttgart, Germany; and Department of Mechanical Engineering & Robotics Institute, Carnegie Mellon University, E4344-E4353; PNAS; Published on May 15, 2017.

\* cited by examiner

REVERSIBLE ADHESIVE APPARATUS

CROSS-REFERENCE TO RELATED APPLICATION

This application claims priority to, U.S. Provisional Patent Application No. 63/043,216, filed on Jun. 24, 2020, and entitled "SYSTEMS AND METHODS FOR USING REVERSIBLE ADHESIVES IN INDUSTRIAL AUTOMATION." The entirety of the related patent application is incorporated herein by reference.

FIELD OF THE DISCLOSURE

The present disclosure relates to a reversible adhesive apparatus for providing reversible adhesion in industrial automation systems.

BACKGROUND OF THE DISCLOSURE

Reversible adhesion, as a repeatable, robust, and power efficient mode of adhesion, has aroused extensive research interest. The Gecko-like material enables high load bearing, easy adhering and easy releasing. These adhesive can be advantageously used in industrial automation systems for providing reversible adhesion in various scales.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the features, which illustrate the exemplary embodiments in detail, it should be understood that the application is not limited to the details or methodology set forth in the description or illustrated in the figures. It should also be understood that the terminology is for the purpose of description only and should not be regarded as limiting.

Some embodiments of the present invention relate to a reversible adhesive apparatus that includes a base and an adhesive layer. The base is configured with a series of concave and convex shapes at a top surface of the base. The adhesive layer is disposed on top of the base. The adhesive layer configured to provide reversible adhesion on a top surface of the adhesive layer.

Some embodiments of the present invention relate to a reversible adhesive apparatus that includes a base and an adhesive layer. The base is configured with a raised portion and a surrounding portion at a top surface of the base. The adhesive layer is disposed on top of the base. The adhesive layer configured to provide reversible adhesion on a top surface of the adhesive layer.

The reversible adhesive apparatus disclosed herein can be used in various industrial automation applications, such as independent cart technology (ICT), robot end effectors, sensors, human machine interface (HMI) devices, smart switches, conveyors, temporary signage, audio or visual indicators, manual tool holders, wireless access points, marking devices (e.g., pen holder), and so on. In some embodiments, the reversible adhesive apparatus may be used in the industrial automation system to replace various traditional mounting devices, such as mounting screws, non-reversible adhesives, wire/cable tie mounts, and wire/cable trays, etc. The reversible adhesive apparatus can be used to temporarily mount various sensors on cabinet and/or enclosures so that the sensor can be easily stick to and remove from the enclosures. In some embodiments, the adhesive apparatus may be used in a tooling process in industrial automation systems. For example, the reversible adhesive apparatus can be used to simplify tooling associated with a pouching process, which can grab the pouch and open better and more simply. For example, the reversible adhesive apparatus can be used to replay a griper on a pick-and-place robot, minimize gripping force for sensitive products (e.g., bio-fabrication products), populate silicon wafers/circuit board in electronics producing process, etc. In some embodiments, the reversible adhesive apparatus can be used for temporary holding various items in the industrial automation systems, such as, temporarily holding HMI and/or phone, switch, actuator, sensor, audio and/or video indicator, signage, instructions, wireless access points, protocol convertors, etc.

Figure 1A:
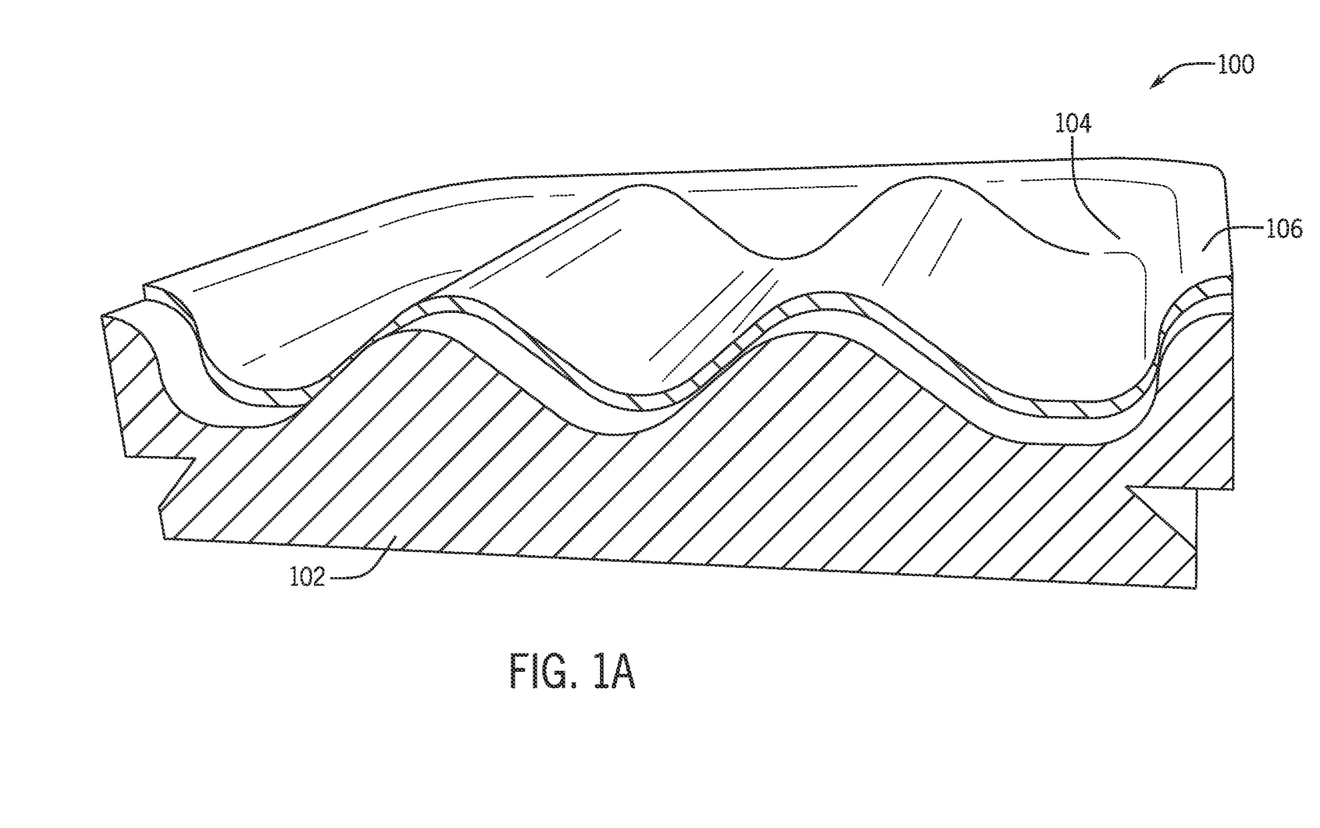
FIG. 1A shows a cross-sectional view of a reversible adhesive apparatus 100 according to an illustrative embodiment.

With reference to FIG. 1A, a cross-sectional view of a reversible adhesive apparatus 100 is shown according to an illustrative embodiment. The reversible adhesive apparatus 100 can be customized with any desired size to accommodate different applications. For example, the reversible adhesive apparatus 100 can be built with a size that fits a top surface of a transportation cart, or built with a size that is enough for attaching a sensor to industrial equipment. The reversible adhesive apparatus 100 includes a base 102 and an adhesive layer 104.

The base 102 may be designed with rigid material (e.g., polyvinyl chloride) or semi-rigid material (e.g., semi-rigid foam, plastic, rubber, etc.) The top surface of the base 102 is formed with a series of concave and convex shapes. These concave and convex shapes are designed to provide a gravity induced shear force when an object placed on top of the surface. In some embodiments, the top surface is designed to have any suitable numbers of concave and convex shapes to accommodate specific applications. The bottom surface of the base 102 is designed to be attached to any component in an industrial system. The base 102 can be attached using any suitable fastening or attaching methods, such as clicking in an adapter, adhering, screwing, etc.

The adhesive layer 104 is disposed on top of the base 102 and attached to the base 102 at an edge portion 106 using any suitable method (e.g., adhesion.) The adhesive layer 104 is formed as a flexible layer that has a lower firmness compared to the base 102. The adhesive layer 104 is designed to be in-contact with the top surface of the base 102 and conform to the shape of the top surface of the base 102 when there is no force applied to the layer to pull it away from the base 102. For example, when there is no force applied to the adhesive layer 104, the flexible adhesive layer 104 has the same shape as the top surface of the base 102. The adhesive layer 104 is designed to partially not in-contact with the top surface of the base 102 when there is force applied to the layer 104 to pull it away from the base 102.

Figure 1B:
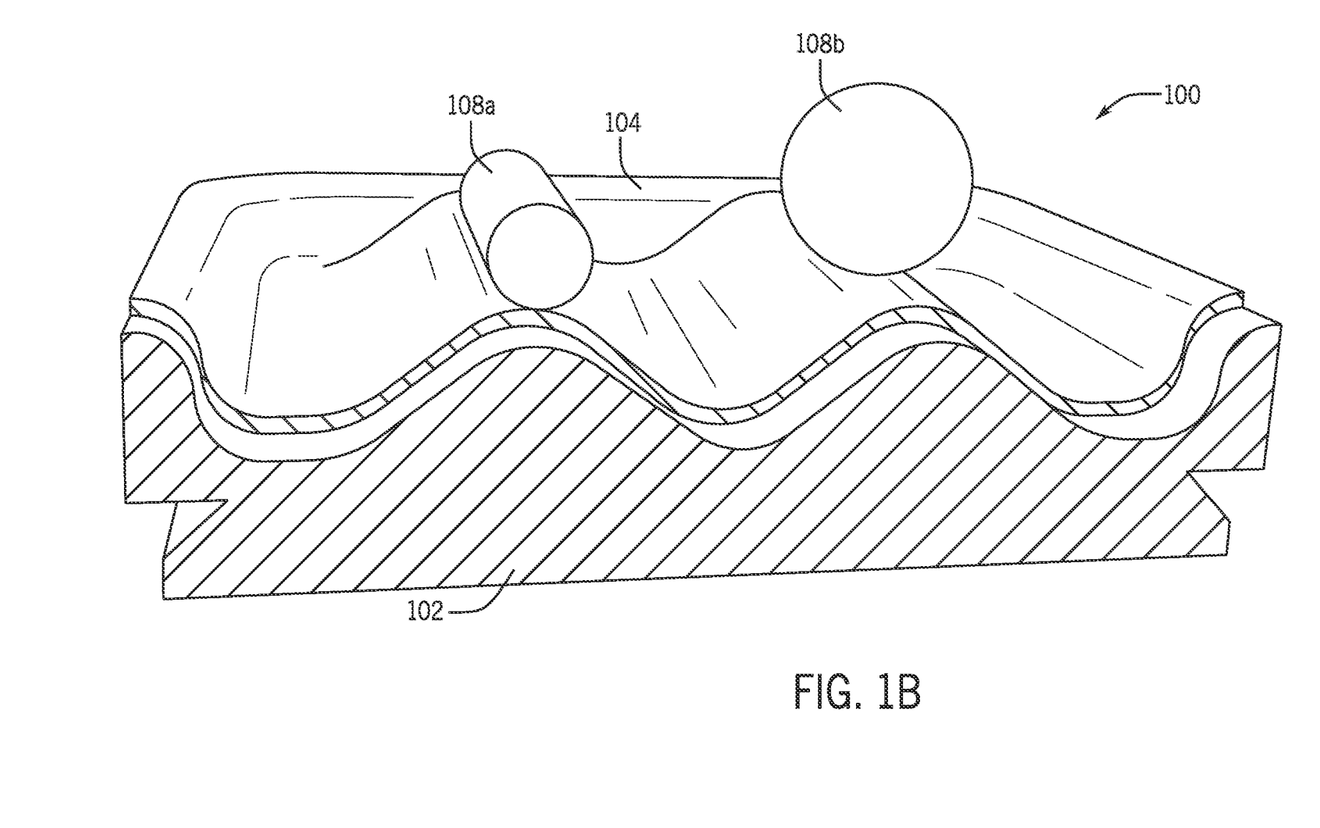
FIG. 1B shows the reversible adhesive apparatus 100 activating adhesion upon one or more objects disposed on top of the reversible adhesive apparatus 100 according to an illustrative embodiment.
Figure 1C:
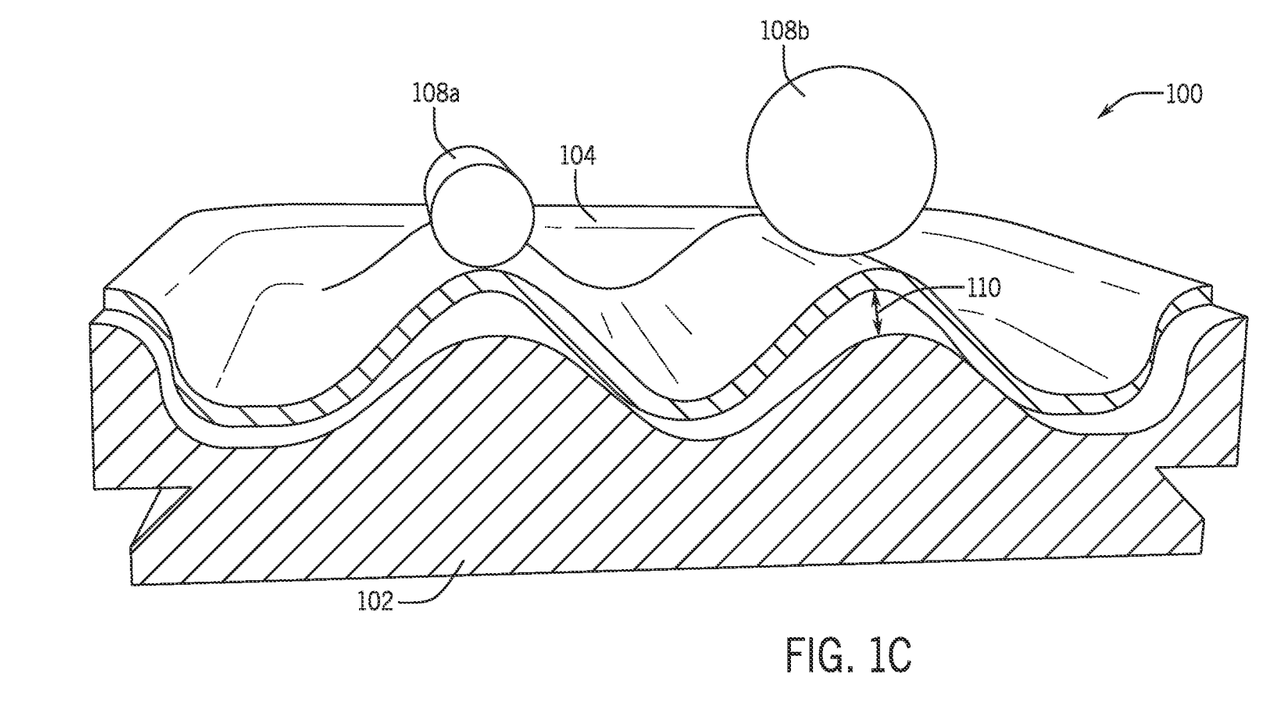
FIG. 1C shows the reversible adhesive apparatus 100 deactivating adhesion upon the one or more objects pulled away from the reversible adhesive apparatus 100 according to an illustrative embodiment.

The top surface of the adhesive layer 104 is formed with reversible adhesive material configured to activate adhesion upon a first shear force between the top surface of the adhesive layer 104 and one or more objects (e.g., objects 108a and 108b) as shown in FIG. 1B and deactivate adhesion upon a second shear force between the top surface of the adhesive layer 104 and the one or more objects as shown in FIG. 1C. In some embodiments, the first shear force is generated by the gravity of the object. For example, when the objects 108a and 108b are disposed on top of the adhesive layer 104 that covers the wavey shaped top surface of the base 102, the objects 108a and 108b tend to roll from the convex portion to the concave portion of the base 102 due to gravitational acceleration. This gravity induced movement generates the first shear force between the objects and the adhesive layer 104. The first shear force activates adhesion of the adhesive layer 104, so that the objects 108a and 108b adhere to the adhesive layer 104. The adhesion between the adhesive layer 104 and the objects can overcome the gravity of the objects.

The bottom surface of the adhesive layer 104 is formed with non-adhesive material configured to be in-contact with the top surface of the base 102 such that the flexible adhesive layer 104 forms the same shape as the top surface of the base 102 when there is no force applied on the adhesive layer 104 to pull it away from the base 102. As shown in FIG. 1C, the adhesive layer 104 may be partially pulled away with a distance 110 from the top surface of the base 102 by an adhered object (e.g., object 108a or 108b) to generate the second shear force that deactivate the adhesion between the object and the adhesive layer 104.

Figure 2A:
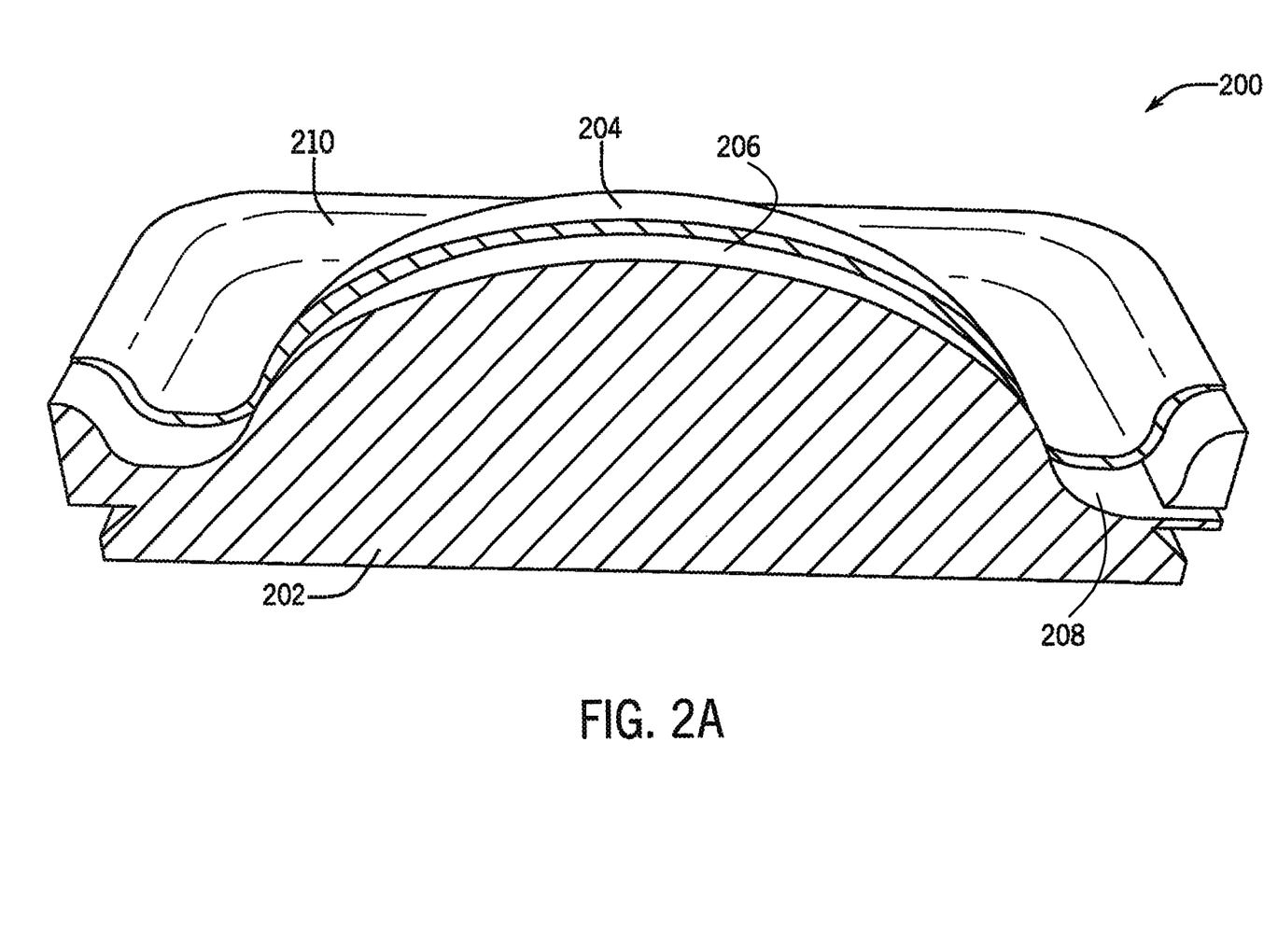
FIG. 2A shows a cross-sectional view of a reversible adhesive apparatus 200 according to an illustrative embodiment.

With reference to FIG. 2A, a cross-sectional view of a reversible adhesive apparatus 200 is shown according to an illustrative embodiment. The reversible adhesive apparatus 200 can be customized with any desired size to accommodate different applications. For example, the reversible adhesive apparatus 200 can be built with a size that fits a top surface of an independent cart, or built with a size that is enough for attaching a sensor to an industrial equipment. The reversible adhesive apparatus 200 includes a base 202 and an adhesive layer 204.

The base 202 may be designed with rigid material (e.g., polyvinyl chloride) or semi-rigid material (e.g., semi-rigid foam, plastic, rubber, etc.) The top surface of the base 202 is formed with a raised portion 206 (e.g., a dome-like shaped portion) and a surrounding portion 208 that surrounds the raised portion. In some embodiments, the surrounding portion 208 is a recessed portion. These raised portion 206 and the surrounding portion 208 are designed to provide a gravity induced shear force when an object placed on top of the base 202. In some embodiments, the raised portion 206 may have a series of concave and convex shaped top surface as shown in FIG. 2D.

The bottom surface of the base 202 is designed to be attached to any component in an industrial system. The base 202 can be attached using any suitable fastening or attaching methods, such as clicking in an adapter, adhering, screwing, etc.

The adhesive layer 204 is disposed on top of the base 202 and attached to the base 202 at an edge portion 210 using any suitable method (e.g., adhesion.) The adhesive layer 204 is formed as a flexible layer that has a lower firmness compared to the base 202. The adhesive layer 204 is designed to be in-contact with the top surface of the base 202 and conform to the shape of the top surface of the base 202 when there is no force applied to the layer to pull it away from the base 202. For example, when there is no force applied to the adhesive layer 204, the flexible adhesive layer 204 has the same shape as the top surface of the base 202. The adhesive layer 204 is designed to partially not in-contact with the top surface of the base 202 when there is force applied to the layer 204 to pull it away from the base 202.

Figure 2B:
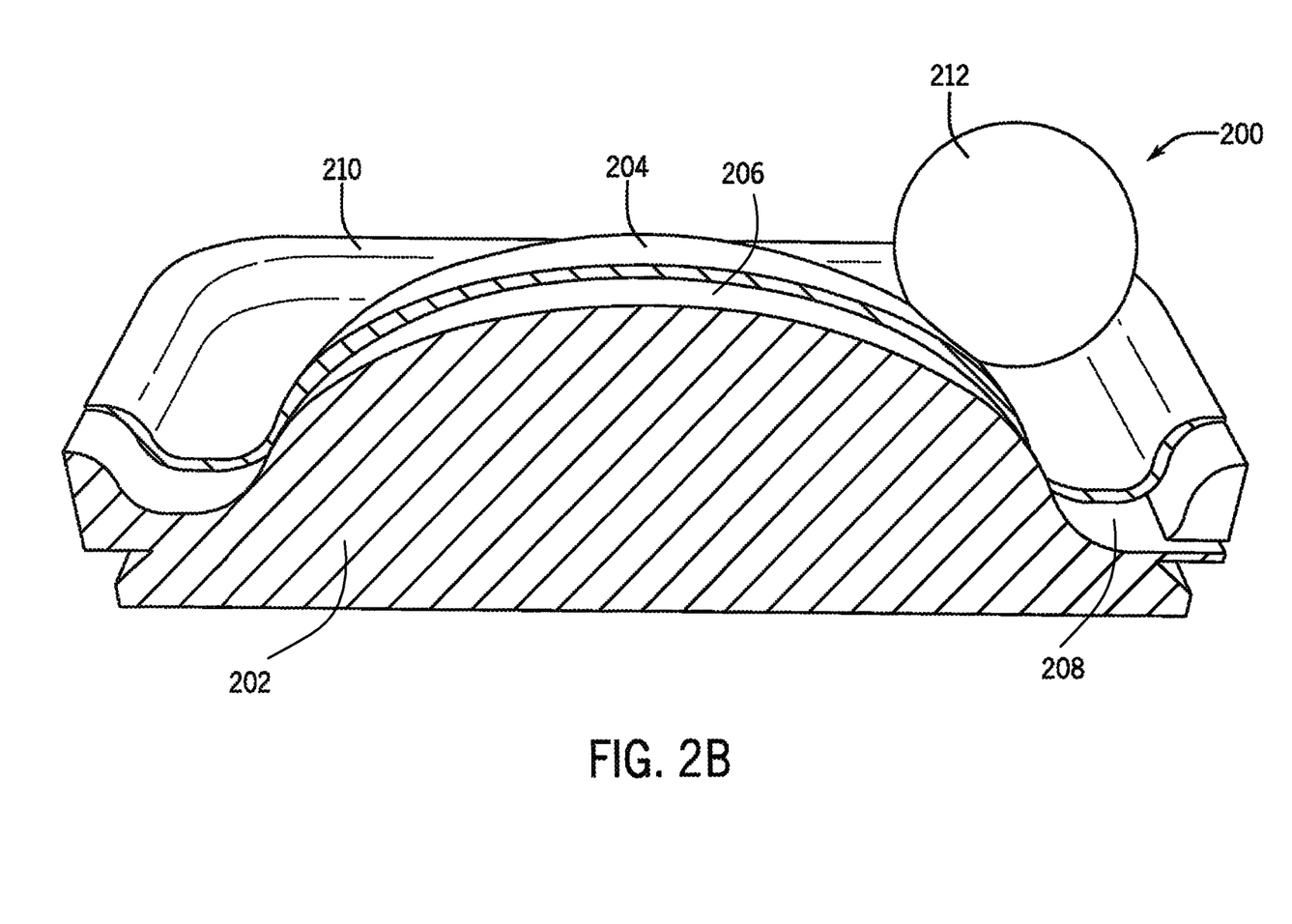
FIG. 2B shows the reversible adhesive apparatus 200 activating adhesion upon one or more objects disposed on top of the reversible adhesive apparatus 200 according to an illustrative embodiment.
Figure 2C:
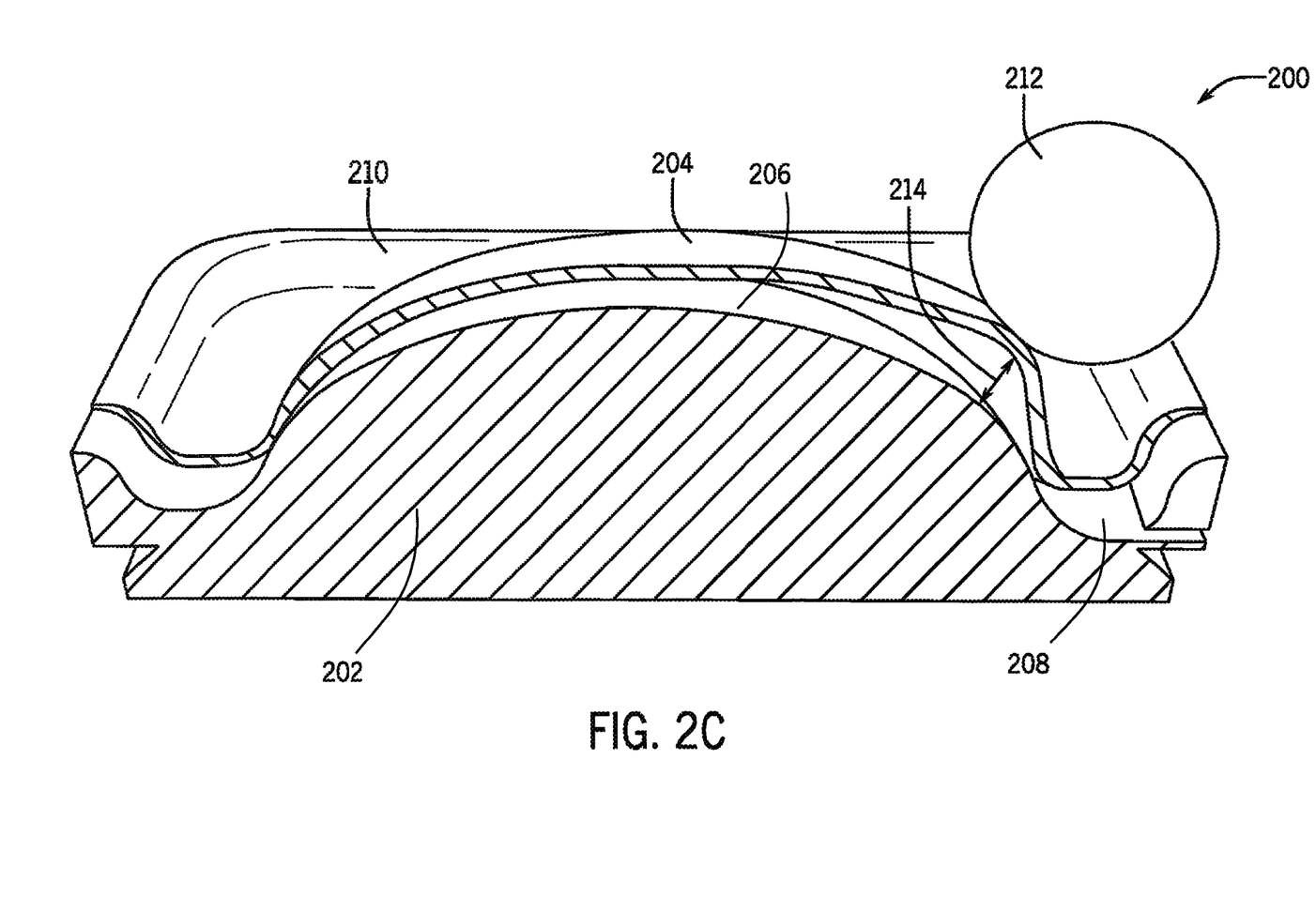
FIG. 2C shows the reversible adhesive apparatus 200 deactivating adhesion upon the one or more objects pulled away from the reversible adhesive apparatus 200 according to an illustrative embodiment.
Figure 2D:
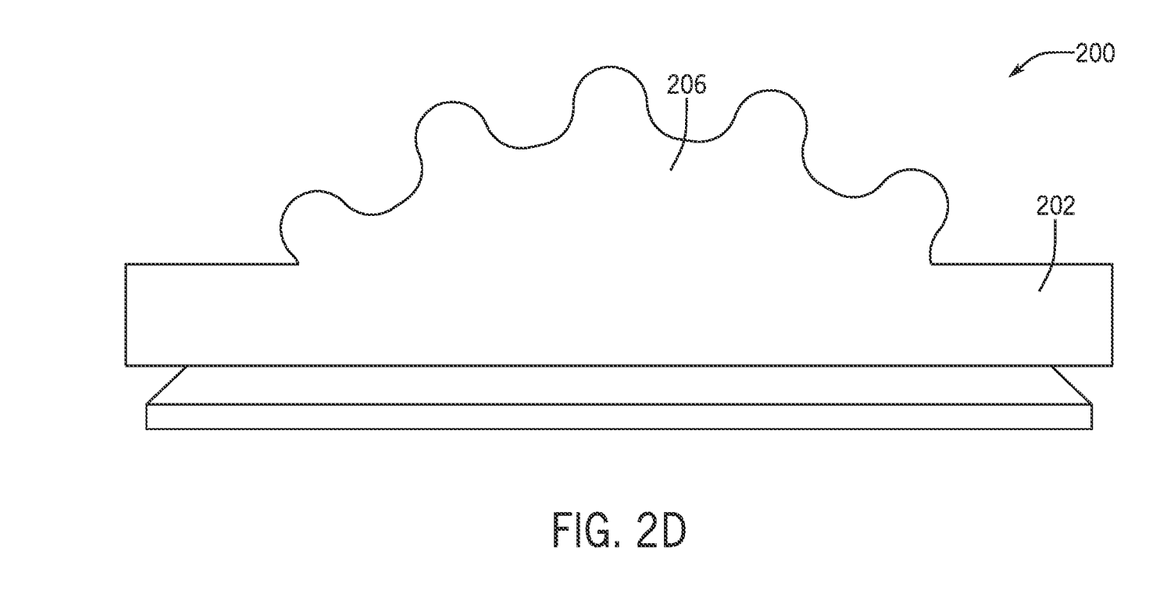
FIG. 2D shows a base 202 of the reversible adhesive apparatus 200 according to another illustrative embodiment.

The top surface of the adhesive layer 204 is formed with reversible adhesive material configured to activate adhesion upon a first shear force between the top surface of the adhesive layer 204 and one or more objects (e.g., object 212) as shown in FIG. 2B and deactivate adhesion upon a second shear force between the top surface of the adhesive layer 204 and the one or more objects as shown in FIG. 2C. In some embodiments, the first shear force is generated by the gravity of the object. For example, when the object 212 is disposed on top of the adhesive layer 204 that covers the dome-like shaped top surface of the base 202, the object 212 tends to roll from the raised portion 206 to the surrounding portion 208 of the base 202 due to gravitational acceleration. This gravity induced movement generates the first shear force between the object 212 and the adhesive layer 204. The first shear force activates adhesion of the adhesive layer 204 so that the object 212 adheres to the adhesive layer 204. The adhesion between the adhesive layer 204 and the object 212 can overcome the gravity of the object 212.

The bottom surface of the adhesive layer 204 is formed with non-adhesive material configured to be in-contact with the top surface of the base 202 such that the flexible adhesive layer 204 forms the same shape as the top surface of the base 202 when there is no force applied on the adhesive layer 204 to pull it away from the base 202. As shown in FIG. 2C, the adhesive layer 204 may be partially pulled away with a distance 214 from the top surface of the base 202 by an adhered object (e.g., object 212) to generate the second shear force that deactivate the adhesion between the object and the adhesive layer 204.

Figure 3:
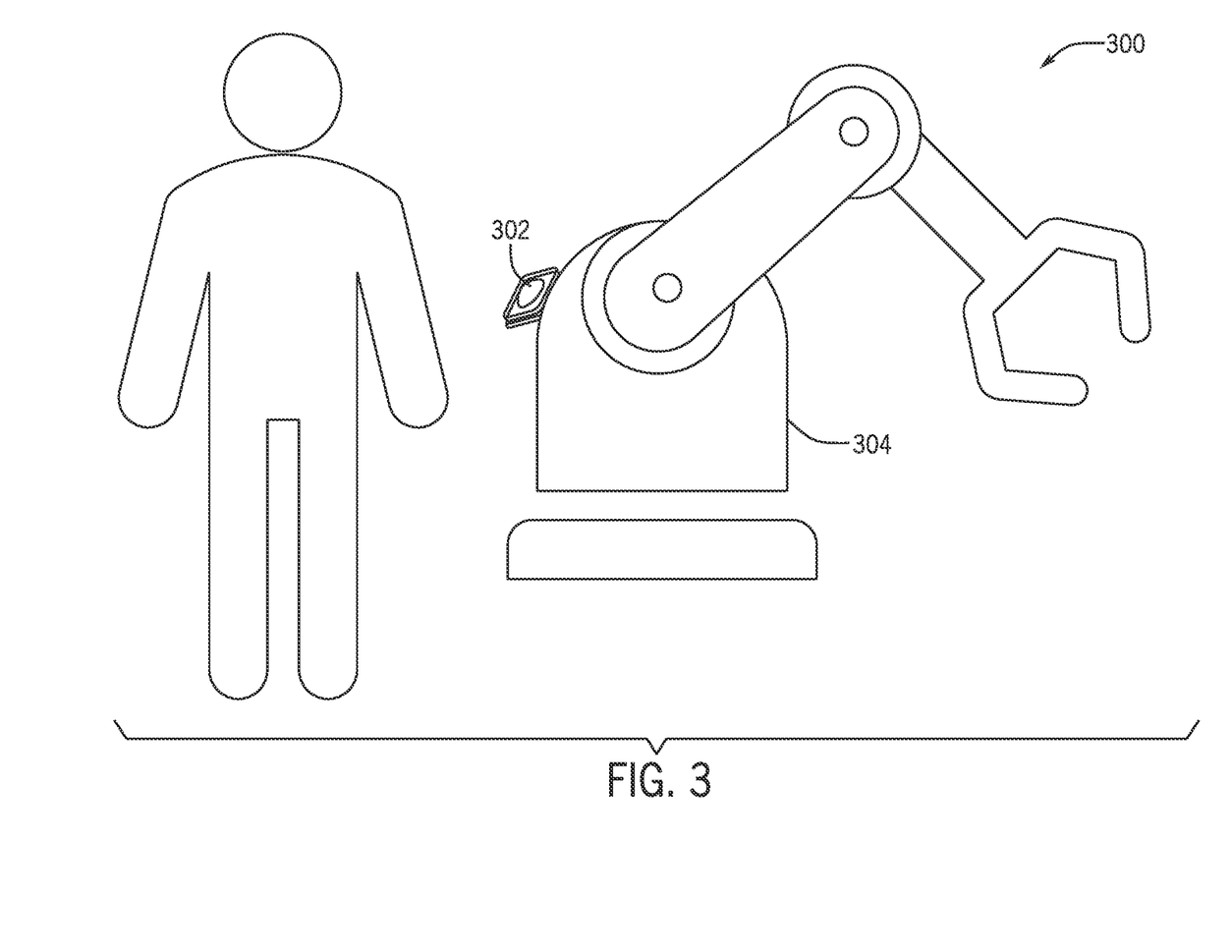
FIG. 3 shows an industrial automation system 300 that utilizes a reversible adhesive apparatus.

FIG. 3 shows an example industrial automation system 300 that utilizes a reversible adhesive apparatus 302. The reversible adhesive apparatus 302 may be any of the reversible adhesive apparatus as described above (e.g., apparatus 100,200.) The reversible adhesive apparatus 302 is installed on an equipment of the system 300. The equipment 304 can be any device in the industrial automation system 300, such as a base of a robot arm. The reversible adhesive apparatus 302 can be used to hold items for a user temporarily, such as holding a phone, a tool, a sensor, etc. The reversible adhesive apparatus 302 can be used to hold items for a long time period (e.g., monitors, sensors, signage, etc.) according to some embodiments.

The subject matter as described above includes various exemplary aspects. However, it should be appreciated that it is not possible to describe every conceivable component or methodology for purposes of describing these aspects. One of ordinary skill in the art can recognize that further combinations or permutations can be possible. Various methodologies or architectures can be employed to implement the various embodiments, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "top" and "bottom" in connection with side and surface, etc., for purposes of identifying or differentiating one from another or from others. These terms are not intended to merely relate entities (e.g., top surface and bottom surface) temporally or according to an orientation, although in some cases, these entities can include such a relationship. Nor do these terms limit the number of possible entities (e.g., surfaces) that can operate within a system or environment.

What is claimed is:

1. A reversible adhesive apparatus, comprising:
   a base configured with concave and convex shapes at a top surface of the base;
   an adhesive layer disposed on top of the base and conforming to the concave and convex shapes of the top surface of the base, wherein the adhesive layer comprises:
   an adhesive layer top surface including a reversible adhesive to provide reversible adhesion on the adhesive layer top surface when adhesion of the reversible adhesive is activated by a first shear force acting between an associated object and the adhesive layer top surface; and
   a non-adhesive bottom surface in contact with and conforming to the concave and convex shapes on the top surface of the base and adapted to be selectively pulled away from the top surface of the base to generate a second shear force between the associated object and the adhesive layer that deactivates adhesion between the associated object and the adhesive layer top surface.

2. The reversible adhesive apparatus of claim 1, wherein the raised portion has a dome shape and the surrounding portion is a recessed portion surrounding the raised portion.

3. The reversible adhesive apparatus of claim 1, wherein the base is rigid or semi-rigid.

4. The reversible adhesive apparatus of claim 3, wherein the adhesive layer is flexible and has lower firmness compared to the base.

5. The reversible adhesive apparatus of claim 1, wherein the adhesive layer is attached to the base at an edge portion.

6. The reversible adhesive apparatus of claim 1, wherein the adhesive layer is configured to activate adhesion upon a first shear force generated between an object and the adhesive layer.

7. The reversible adhesive apparatus of claim 6, wherein the first shear force is generated by gravity induced movement between the object and the adhesive layer.

8. The reversible adhesive apparatus of claim 1, wherein the adhesive layer is configured to deactivate adhesion upon a second shear force generated between an object adhered to the adhesive layer.

9. The reversible adhesive apparatus of claim 8, wherein the second shear force is generated by pulling the adhered object away from the adhesive layer such that the adhesive layer is pulled away from the top surface of the base.

10. A reversible adhesive apparatus, comprising:
    a base configured with concave and convex shapes at a top surface of the base;
    an adhesive layer disposed on top of the base and conforming to the concave and convex shapes of the top surface of the base, wherein the adhesive layer comprises:
    an adhesive layer top surface including a reversible adhesive to provide reversible adhesion on the adhesive layer top surface when adhesion of the reversible adhesive is activated by a first shear force acting between an associated object and the adhesive layer top surface; and
    a non-adhesive bottom surface in contact with and conforming to the concave and convex shapes on the top surface of the base and adapted to be selectively pulled away from the top surface of the base to generate a second shear force between the associated object and the adhesive layer that deactivates adhesion between the associated object and the adhesive layer top surface.

11. The reversible adhesive apparatus of claim 10, wherein the concave and convex shapes comprise a series of two convex shapes and three concave shapes.

12. The reversible adhesive apparatus of claim 10, wherein the base is rigid or semi-rigid.

13. The reversible adhesive apparatus of claim 12, wherein the adhesive layer is flexible and has lower firmness compared to the base.

14. The reversible adhesive apparatus of claim 10, wherein the adhesive layer is attached to the base at an edge portion.

15. The reversible adhesive apparatus of claim 1, wherein the first shear force is generated by gravity induced movement between the associated object and the adhesive layer.

* * * * *